United States Patent [19]

Hollitt et al.

[11] Patent Number: 5,427,749
[45] Date of Patent: Jun. 27, 1995

[54] PRODUCTION OF SYNTHETIC RUTILE

[75] Inventors: Michael J. Hollitt, South Melbourne; Brian A. O'Brien, Bentley; Ian E. Grey, Port Melbourne, all of Australia

[73] Assignee: Wimmera Industrial Minerals Pty. Ltd., South Melbourne, Australia

[21] Appl. No.: 927,665

[22] PCT Filed: Mar. 1, 1991

[86] PCT No.: PCT/AU91/00069
§ 371 Date: Nov. 2, 1992
§ 102(e) Date: Nov. 2, 1992

[87] PCT Pub. No.: WO91/13180
PCT Pub. Date: Sep. 5, 1991

[30] Foreign Application Priority Data

Mar. 2, 1990 [AU] Australia ............... PJ8919

[51] Int. Cl.$^6$ ............... C01G 23/00; C01G 25/00; C01G 27/00; C22B 34/10
[52] U.S. Cl. ............... 423/74; 423/80; 423/83; 423/86
[58] Field of Search ............... 423/74, 80, 83, 86

[56] References Cited

U.S. PATENT DOCUMENTS 4,097,574 6/1978 Auger et al. ............... 423/74

FOREIGN PATENT DOCUMENTS 247110 9/1963 Australia.
9004656 5/1990 WIPO.

OTHER PUBLICATIONS

Becher et al., "A New Process for Upgrading Ilmenitic Mineral Sanas", Australian Institute of Mining Proceedings, 6 1965, pp. 21–43.
"The Reduction of Radionuclides in Titaniferous Feedstocks", Ellis et al, Industrial Minerals International Congress, pp. 102–108. (1992 or later).
"The AMC Narngulu Synthetic Rutile Plant", Cassidy et al, The AusIMM Perth Branch, Australia, Sep./Oct. 1986, pp. 123–128.
"Direct Reduction Technology-The Western Titanium Process for the Production of Synthetic Rutile, Ferutil, and Sponge Iron", Bracanin et al, Proc. Australas No. 271, Sep. 1980, pp. 33–42.
"Ilmenite Research in CSIRO-Part 1", pp. 4–9.
"Investigation of the Segregation of Iron From Ilmenite", Tittle et al, Mining & Metallurgy, Sep. 1973, pp. C135–C139.
"The Modified Metallurgical Upgrading of Ilmenite to Produce High Grade Synthetic Rutile", Rolfe, The AusIMM Conference, W. Australia May 1973, (incomplete).
"Reduction of Ilmenite in a Commercial Rotary Kiln-An X-Ray Detraction Study", Grey et al, AusIMM Conference, W. Australia May 1973, pp. 583–605.
"Synthetic Rutile-Its Present and Future Role as a Feedstock in the Pigment and Metal Industry", Cassidy et al, 7th Industrial Minerals Int. Congress, Apr. 1986, pp. 207–215.
"The Development of a Direct Reduction and Leach Process for Ilmenite Upgrading", Bracanin et al, pp. 209–259. (incomplete).

Primary Examiner—Mukund J. Shah
Assistant Examiner—Matthew V. Grumbling
Attorney, Agent, or Firm—Thomas R. Vigil

[57] ABSTRACT

The specification describes a process for producing synthetic rutile from a titaniferous ore or concentrate. The process involves three basic steps which are reduction, removal or iron by leaching or aeration and removal of other impurities by leaching in a solution of a strong mineral acid such as hydrochloric acid or sulphuric acid. The conditions of reduction are controlled to promote the formation of metallic iron, a major rutile phase and a minor impurity bearing phase. The minor impurity phase may be a metatitanate, an anosovite or a pseudobrookite. However, formation of a metatinatate is normally preferred. Suitable reductants include carbonaceous materials or hydrogen bearing gases such as natural gas or synthesis gas. The process is capable of removing more than 80% of each of the contained iron magnesium and manganese remaining as oxides after reduction. Substantial proportions of contained aluminum can also be removed.

39 Claims, No Drawings

PRODUCTION OF SYNTHETIC RUTILE

This invention relates to the treatment of titaniferous ores, for upgrading the titania content thereof.

In a particular embodiment the present invention provides a process for the removal of all or part of any iron, magnesium, manganese and aluminium from titanium bearing mineral ores or concentrates. In a general aspect the process of the invention comprises three basic steps, namely (i) a reduction step;
(ii) a first stage leaching or aeration step, and;
(iii) a second stage leaching step.

In step (i) the iron content of the titaniferous mineral is partially converted to metal by gaseous or carbothermic reduction.

In step (ii) the product of step (i) is subjected to an aqueous treatment, resulting either in the dissolution of the metallic iron content of the mineral or in the conversion of the metallic iron to a separable iron oxide product.

In step (iii) the titaniferous product of step (ii) is subjected to a leaching treatment, using one of a number of possible reagents, for at least partial removal of residual iron, magnesium, manganese and aluminium. The titaniferous product of leaching will then be of particularly high titania content and may be used in place of natural rutile oar other high titania content materials.

Additional steps may be employed as will be described below.

In the prior art synthetic rutile has been formed from titaniferous minerals, e.g. ilmenite, via various techniques. According to the most commonly applied technique, as variously operated in Western Australia, the titaniferous mineral is reduced with coal or char in a rotary kiln, at temperatures in excess of 1100° C. In this process the iron content of the mineral is substantially metallized. Sulfur additions are also made to convert manganese impurities to sulfides. Following reduction the metallized product is cooled, separated from associated char, and then subjected to aqueous aeration for removal of virtually all contained metallic iron as a separable fine iron oxide. The titaniferous product of separation is treated with 2–5% aqueous sulfuric acid for dissolution of manganese and some residual iron. There is no substantial removal of magnesium or aluminium from the product at any point in this process, and iron removal is only effected in the aeration step. After calcination the synthetic rutile contains approximately 92% $TiO_2$ and 1–2% iron as oxide.

The major use for synthetic rutile is as feedstock for the production of white titanium dioxide pigment via the chloride process. According to this process titania bearing minerals are charged with a carbon source to a fluidized bed chlorination reactor wherein gaseous titanium tetrachloride is formed. The titanium tetrachloride is subsequently condensed and purified and then is oxidized to titanium dioxide for use in pigments. The impurities iron, magnesium, manganese and aluminium in titaniferous feedstocks each have deleterious effects, either in chlorination, condensation or purification. Where a titaniferous mineral, such as ilmenite, has high levels of magnesium or aluminium it cannot be converted to a synthetic rutile by the Western Australian process which does not remove these impurities. Further, residual iron and manganese, as well as magnesium and aluminium, result in performance based penalties for synthetic rutile feedstocks to chlorination.

In other prior art inventions high degrees of removal of magnesium, manganese, iron and aluminium have been achieved. In one such process the ilmenite is first thermally reduced to substantially complete reduction of its ferric oxide content, normally in a rotary kiln. The cooled reduced product is then leached under 35 psi pressure at 140°–150° with excess 20% hydrochloric acid for removal of iron, magnesium, aluminium and manganese. The leach liquors are spray roasted for regeneration of hydrogen chloride, which is recirculated to the leaching step.

In other processes the ilmenite undergoes grain refinement by thermal oxidation followed by thermal reduction (either in a fluidized bed or a rotary kiln). The cooled, reduced product is then subjected to atmospheric leaching with excess 20% hydrochloric acid, for removal of the deleterious impurities. Acid regeneration is also performed by spray roasting in this process.

In yet another process ilmenite is thermally reduced (without metallization) with carbon in a rotary kiln, followed by cooling in a nonoxidizing atmosphere. The cooled, reduced product is leached under 20–30 psi gauge pressure at 130° C. with 10–60% (typically 18–25%) sulphuric acid, in the presence of a seed material which assists hydrolysis of dissolved titania, and consequently assists leaching of impurities. Hydrochloric acid usage in place of sulfuric acid has also been claimed for this process.

The major disadvantage of all processes using hydrochloric acid leaching for the formation of synthetic rutile from iron bearing titaniferous minerals such as ilmenite is the need to operate acid regeneration from the chloride liquors formed in leaching. Such acid regeneration requires combustion of large quantities of fuel to provide the necessary heat. The cost of synthetic rutile production by these methods, which are applicable to more general titaniferous minerals due to the ability to remove impurities, is uncompetitive with the reduction/aeration process operated in Western Australia. The major reason for this cost disadvantage is the formation of large quantities of iron chlorides in the process of impurity removal, placing a consequent heavy load on the acid regeneration system.

The major disadvantage of processes using sulfuric acid for the formation of synthetic rutile from iron bearing titaniferous minerals such as ilmenite is the need to dispose of aqueous iron sulfates (and other sulfates) front the liquors formed in leaching, in the absence of a by-product use for such liquors. Neutralisation with lime, producing large quantities of red gypsum, which must be disposed of in managed land based repository, will normally be necessary.

In summary, existing processes for the formation of synthetic rutile products from titaniferous minerals such as ilmenite will either not be effective in the removal of deleterious impurities or will not be cost effective due to the need to regenerate large quantities of expensive reagents or to neutralise and dispose of large volumes of leachate liquors. It is the object of the present invention to overcome, or at least alleviate some of these difficulties.

Accordingly, the present invention provides a process for upgrading the titania content of a titaniferous ore or concentrate which process comprises the steps of:

(i) reducing the titaniferous ore or concentrate under conditions which promote the formation of metallic iron, a major rutile phase and a minor impurity bearing phase;

(ii) cooling the product of step (i) in an oxygen free environment;

(iii) subjecting the cooled product of step (i) to a first stage leaching or aeration to convert: metallised iron into a readily removable form;

(iv) removing iron from the product of step (iii);

(v) subjecting the product of step (iv) to a second stage leaching to convert other impurity elements to a readily removable form; and (vi) removing the other impurity elements from the product of step (v).

In the process the iron present in the titaniferous mineral may be partially reduced to metallic iron by coke, char or coal, gaseous fuels such as hydrogen, natural and petroleum gas or products thereof, or liquid fuels such as oil or products thereof. The temperature of reduction should be above 900° C. in the case of solid carbonaceous reductants and above 600° C. in the case of hydrogen bearing gaseous reductants. For each mineral the optimum temperature of reduction will depend on the level of impurities present and the reductant used. In general, conditions should be set such that the predominant titanium bearing phase in the mineral after reduction is rutile or reduced rutile, while magnesium, manganese and residual (non-metallised) iron are predominantly concentrated into a small amount of a separate phase. This separate phase may have either the anosovite/pseudobrookite "$M_3O_5$" structure or an ilmenite-like "$M_2O_3$" structure. The latter structure is advantageous in subsequent steps of the process.

Reduction may be carried out in any suitable device including fluidized beds and rotary kilns. The presently preferred apparatus is a rotary kiln charged with solid carbonaceous reductant such as coal, char or coke and operated with a maximum temperature in the range 950°–1050° C. However, higher temperatures may be operated, especially for ilmenites having low levels of impurities. It is not anticipated that the process would be operated at temperatures in excess of 1200° C. due to the unavoidable formation of large quantities of non rutile phases, particularly $M_3O_5$, and a tendency for the mineral to sinter and accrete at higher temperatures. The formation of appreciable quantities of non-rutile phases may result in low selectivity of impurity removal in the final leaching step of the process due to the dissolution of solubilised titania. Formation of $M_3O_5$ in preference to $M_2O_3$ will result in a need to use more aggressive conditions (higher acid strength, temperature and time) in leaching, which may be difficult to apply in practice.

The degree of conversion of the titaniferous mineral iron content to metal is not a critical part of the process provided that the sought after phases are produced in reduction. The optimum degree of metallization will be determined primarily by economic considerations in most circumstances. In general, degrees of metallization in the range 50–95%, depending on mineral composition, will be suitable. A suitable degree of metallization can be achieved in residence times from 30 minutes to several hours at or above 900° C. for carbothermic reduction in a rotary kiln. Actual metallization for a given reduction time and temperature will depend on the nature of the mineral and the nature of the reductant (e.g. on carbon reactivity).

After reduction and the attainment of the desired degree of metallization, the material being heated must be cooled almost to room temperature in an essentially oxygen free environment. Cooling may be conducted in a cooler which forms an integral part of the reduction unit or in a separate cooling unit in an atmosphere of inert gases or reduction product gases.

Separations of carbonaceous material from minerals may then be performed by a suitable combination of magnetic and size separations, with the carbonaceous component recirculated, as appropriate.

Metal may be removed from the cooled mineral particles by any suitable means. Aqueous chemical methods are most suitable. Acid leaching using any commercially available acid is effective in removing iron but results in iron salts in solution. The resulting solution will normally require iron precipitation by neutralisation, spray roasting to iron oxide for acid recovery, or some other means of further treatment to avoid the need for disposal of environmentally harmful wastes. The most advantageous method for iron metal removal is aqueous aeration, in which air is blown through an agitated aqueous suspension of metallized mineral in the presence of added reagents such as ammonium chloride. Iron metal is converted to iron oxides according to this method. This technique is well known in the prior art. By adjustment of conditions the nature of the iron oxide product of aeration can be altered and its formation as a separable, finely grained suspension can be ensured.

Following aeration, separation of the titaniferous product from the iron oxides can be effected by any suitable method of sizing separation, such as by passage through cyclone separators. The coarser titaniferous product may then be dewatered by any suitable technique or combination of techniques, e.g. thickening and filtration.

The dewatered titaniferous product of aqueous chemical treatment according to the described process contains virtually all of its original magnesium, manganese and aluminium, and may have substantial quantities of residual iron oxides which were previously not metallized or have adhered during an aeration step. It has been found that leaching with strong mineral acid having a concentration in the range from 4 to 50 weight percent is effective in the removal of these impurities, provided that appropriate conditions have been used in reduction.

Acid leaching using strong mineral acids under agitated conditions may be applied to impurity removal. For example, both sulfuric and hydrochloric acids have been shown to be effective. Prior to leaching it may be advantageous to grind the titaniferous mineral to assist leaching kinetics, although this step is not essential to the process. Leaching with excess 18–20 wt % HCl has been found to be particularly advantageous, and is preferred although lower concentration of acid (e.g. down to 4 wt %) have also been found to be effective.

Acid leaching may be conducted in any suitable batch or continuous leach vessel. For example, heated, agitated vessels or fluidized bed vessels may be used. Typically the leaching temperature will be 80°–150° C., depending on the leachant. Leaching may be conducted either at atmospheric or at elevated pressures, although a feature of the present invention is the ability to operate the leach step without the need for pressure vessels. Leaching time may be from 15 minutes to 24 hours, depending on the phase assemblage present in the reduced mineral and the desired degree of impurity removal. Greater than 80% removal of each of iron, magnesium, manganese, partial removal of aluminium may be easily achieved by the described process.

At the conclusion of leaching the leach liquor may be separated from the mineral by any suitable means including thickening, washing and filtration. The mineral product is then dried and calcined for removal of moisture and chemically combined water.

Calcination at temperatures in the range 300°–900° C. has been found to be effective. The resulting synthetic rutile product will contain greater than 90% $TiO_2$ and up to 99% $TiO_2$, depending on the level of impurities in the original titaniferous mineral grains, and the presence of non titaniferous grains in the original mineral which are retained through the process.

Additional steps may be incorporated in the process, as desired. For example:

(1) The original titaniferous mineral may be agglomerated prior to reduction, with or without pre-grinding, by any suitable technique. In this manner a size consist which most suits the process dynamics of subsequent steps, e.g. reduction, may be obtained.

(2) Additives, such as chlorides or oxides (e.g. $MnO_2$), may be mixed into the titaniferous mineral prior to reduction in order to redistribute the metallic iron produced via segregation reactions, thereby influencing metallic iron removal, or to encourage the formation of an acid leachable minor impurity bearing phase.

(3) The titaniferous mineral, or admixture containing the titaniferous mineral may be oxidized at elevated temperatures, preferably in excess of 700° C., to provide a degree of preheat to the mineral prior to reduction, and to enhance the rate and extent of the reduction reaction.

(4) Following reduction the cooled, partially metallized mineral may be subjected to magnetic or other separation procedure for removal of impurity grains which do not metallize. Grinding prior to such separation may be operated with the objective of liberation of impurity grains from titaniferous grains.

(5) Mineral separations based on magnetic separation, gravity separation, flotation or any other separation technique may be performed either after removal of metallic iron from the reduced mineral or after final acid leaching and/or calcination. In this manner impurity grains e.g. chromite may be removed.

(6) The final titaniferous product may be agglomerated, with or without pregrinding, by any suitable technique, to produce a size consist which is suitable to the market for synthetic rutile. After agglomeration the product may be fired at temperatures sufficient to produce sintered bonds, thereby removing from dusting losses in subsequent applications. Firing in this manner may remove from the need for product calcination.

(7) Leaching may be conducted either batch-wise or continuously, or in multiple co-current or counter-current (in relation to solids and liquid flows) stages.

Within the disclosed process there is great flexibility in relation to the degree of iron removal in the first and second stages of aqueous treatment, and therefore the acid recovery or neutralization costs. For many titaniferous feeds higher degrees of metallization in reduction will correspond to greater difficulty of subsequent impurity removal in acid leaching due to the stabilization of impurities in the less reactive anosovite phase. Consequently, an optimum balance between leach liquor treatment costs and difficulty of impurity removal may be struck, depending on the economic environment.

EXAMPLES

The following examples describe a number of laboratory and pilot scale tests which serve to illustrate the techniques disclosed herein.

Example 1

300 g of ilmenite in the size range 45–65 μm having the composition given in Table 1 was mixed in equal weight proportions with Victorian brown coal char and placed in a 50 mm I.D. lidded stainless steel pot. This pot was then situated in a 950° C. muffle furnace for 3.5 hours, after which time it was removed and allowed to cool.

The cooled mineral product was separated from associated char by magnetic separation, and then leached for removal of metallic iron with excess 5% sulfuric acid for 90 minutes.

In this step 89% of the iron content of the reduced mineral was removed into solution. The solids residue was filtered away from the liquor and then leached with refluxing 50 wt % sulfuric acid for 24 hours. The rate of removal of magnesium is indicated by FIG. 1. After 24 hours; of leaching the leached solids contained 0.77% MgO, compared with an initial 2.25% (dry basis). However, approximately 15% of the titania was also taken into solution.

Example 2

1 kg of agglomerated ilmenite ($-710+250$ μm) having the composition given in Table 1, was mixed in equal weight proportions with Victorian brown coal char ($-7+5$ mm) and heated to 1000° C. under 0.3 m sec$^{-1}$ nitrogen superficial velocity in a fluidized bed reactor. Upon reaching temperature an 0.3 sec$^{-1}$ superficial velocity flow of 50% hydrogen/50% carbon monoxide fluidizing gas was commenced and maintained for a total of 4 hours. At the end of this time the bed was permitted to cool under nitrogen flow and the bed was separated magnetically and by sizing into char and mineral. Chemical analysis indicated that the mineral was 95% metallized.

A 1 g sample of reduced mineral was leached with 5 wt % sulfuric acid to the point of complete removal of metallic iron. The solids residue was then leached with excess boiling 20 wt % HCl solution under reflux for 31 hours. The removal of various elements from the mineral is summarized in the following table:

| Element | Mg | Ti | Mn | Fe | Al |
|---|---|---|---|---|---|
| % Removal | 96.1 | 9.0 | 99.6 | 97.9 | 80.3 |

Example 3

A 2.6:1 (wt basis) Victorian brown coal char ($-5$ mm$+0.5$ mm)/agglomerated ilmenite (Table 1: $-4$ mm$+250$ μm) mixture was fed continuously at 18 kg/hr to an inclined 0.4 m internal diameter, 5 m long rotary kiln. The kiln was fired from the discharge end with a gas burner, and combustibles in the above-bed gas space were combusted by injection of air at controlled rates via air lances at points along the kiln length. The kiln solids bed temperature profile increased uniformly from 200° C. to 1000° C. over the length of the kiln from the charge point to the discharge. Total solids residence time was estimated at 4 hours over this length. The kiln discharge was cooled to room temperature through a spiral cooler. A 300 g sample of cooled kiln discharge was magnetically separated for char removal. A subsample of the magnetic product was analysed by X-ray diffraction, indicating major rutile and metallic iron phases, with minor quantities of the impurity bearing phases anosovite-pseudobrookite and ilmenite-like metatitanate occurring in roughly equal proportions. A further subsample was subjected to analysis for degree of metallization by measurement of the magnetic attractive force on the sample in a saturating magnetic field against a known calibration. The indicated degree to which iron had been converted to metal was 78.3%.

A further 5 g subsample of the magnetic product was subjected to 5 wt % sulfuric acid and 20% hydrochloric acid leaches as described in the previous example. After four hours of the final leach virtually all of the ilmenite-like metatitanate phase had been removed, while most of the anosovite/pseudobrookite phase remained. According to this example the formation of the ilmenite-like metatitanate residual phase is to be encouraged as it is more readily leached, with consequent removal of associated impurities.

Example 4

Ilmenite of the composition provided in Table 2 and in the size range $-250$ μm$+100$ μm was treated through the rotary kiln of Example 3 in a similar manner to that specified above, with the exception that a flat temperature profile,, at 950 50° C., was maintained over the final 2 meters of kiln length.

X-ray diffraction analysis confirmed that for this ilmenite at degrees of metallization in excess of 90% the residual impurity bearing phase in the product reduced in this manner was predominantly metatitanate. It is apparent that at greater levels of impurities, as for the ilmenite of Table 1, the anosovite-pseudobrookite phase is more favored, requiring reduction at lower temperatures if the more readily leached metatitanate phase is desired.

Example 5

Two 3 kg batches of $-65+45$ μm ilmenite having the composition recorded in Table 3 were mixed with 1.5 kg of $-4+1.4$ mm Victorian brown coal char and placed in a muffle furnace for heating to a final steady state bed temperature of 1000°$+5$° C.

The first batch was held above 900° C. (metallization initiation temperature) for 5 hours, while the second batch was held above 900° C. for 3 hours. The batches were removed for cooling in air at the end of the heating period.

Magnetic separation was performed on the products of such reduction for removal of char, and the degree of metallization of contained iron was recorded for the magnetic fraction as follows:

|  | % metallisation |
| --- | --- |
| Batch 1 | 87 |
| Batch 2 | 47 |

The metallized minerals were subjected to iron metal removal by leaching with excess 5 wt % $H_2SO_4$ for 90 minutes at 80° C., before filtration, washing and drying to recover leached solids. X-ray diffraction analysis indicated the following phase distributions:

|  | Batch 1 | Batch 2 |
| --- | --- | --- |
| Rutile | 44% | 32% |
| $M_3O_5$ | 30% | 10% |
| $M_2O_3$ | 12% | 43% |

The above materials were each subjected to leaching with refluxing excess 20 wt % hydrochloric acid for 6 hours. Extractions of residual impurities from the already demetallized material were as follows:

| % Removal | Batch 1 | Batch 2 |
| --- | --- | --- |
| Iron | 41.4 | 96.5 |
| Manganese | 14.3 | 88.9 |
| Magnesium | 27.8 | 80.9 |
| Aluminium | 17.1 | 18.0 |

Titanium extraction was negligible in each case.

X-ray diffraction analysis of the residues in each case indicated complete removal of the ilmenite, with slight removal of the $M_3O_5$ phase in the case of batch 2, but no $M_3O_5$ removal in the case of batch 1.

Samples of each of the demetallized materials were also subjected to leaching with excess refluxing 50% sulfuric acid for up to 24 hours. Extractions of residual impurities in the leaches after one hour were as follows:

| % Removal | Batch 1 | Batch 2 |
| --- | --- | --- |
| Iron | 88.4 | 95.7 |
| Manganese | 81.7 | 86.0 |
| Magnesium | 75.5 | 85.7 |
| Aluminium | 26.1 | 24.9 |

Titanium extraction after one hour in the above cases was high (e.g. 20%) but hydrolysis of dissolved titania occurred over time in the leach to result in losses as low as 0.3%.

X-ray diffraction analysis of the residues in each case indicated virtually complete digestion of both $M_2O_3$ and $M_3O_5$ residual phases.

Example 6

A 5 kg charge of ilmenite ($-65+35$ μm) having the composition provided in Table 4 was fluidized with air at a superficial velocity of 30 cm sec$^{-1}$ (at temperature) in an external heated oxidising fluid bed roast conducted at 900° C. for 30 minutes. The temperature of the fluidized bed was then allowed to fall to 750° C. and the bed was purged with nitrogen at 30 cm sec$^{-1}$ fluidizing velocity for 30 minutes. The fluidizing gas was then replaced with hydrogen at a superficial velocity of 64 cm sec$^{-1}$ Hydrogen reduction continued for 160 minutes, after which time the hydrogen was replaced with a purge of nitrogen and the bed was allowed to cool.

Analysis of the reduced ilmenite product indicated that 76% of its contained iron was metallized. This metallization was removed by a 90 minute leach in 5 wt % $H_2SO_4$ at 80° C. The filtered and dried leach residue was then subjected to a further leach with excess 8.7 wt % hydrochloric acid /100 gram per liter ferrous chloride leachant, under reflux conditions. Extraction of residual impurities in the final leach were as follows:

|  | % Removal |
| --- | --- |
| Iron | 98.7 |
| Manganese | 99.2 |
| Magnesium | 99.0 |
| Aluminium | 13.8 |

X-ray diffraction analysis of demetallized and residue samples indicated that the only residual impurity bearing phase in the demetallized sample was $M_2O_3$ and that this phase was entirely removed by the final leach.

Example 7

Two kilograms of the ilmenite used in example 6 (see Table 4) was oxidised in a rotation pot inserted into a laboratory muffle furnace, at 1000° C. in the presence of excess air. The oxidised ilmenite was allowed to cool, and then mixed 1:1 (weight basis) with Victorian brown coal char ($-5+0.5$ mm). The mixture was then held for one hour in the absence of air in the rotating pot assembly with the furnace set at 950° C., and then allowed to cool.

Char was separated from the cooled mixture by magnetic separation and screening. The iron content of the separated reduced ilmenite was found to be 79.2% metallized.

Metallic iron was removed by a 90 minute leach in 5 wt % $H_2SO_4$ at 80° C. The filtered and dried leach residue was then subjected to further leaches as follows:

Leach 1: Excess 18.5 wt % HCl for 6 hours at 104° C.
Leach 2: Excess 20 wt % $H_2SO_4$ for 6 hours at 130° C. under pressure.

Extraction of residual impurities from demetallized samples were as follows:

|  | % Removal | |
| --- | --- | --- |
|  | Leach 1 | Leach 2 |
| Iron | 77.5 | 88.1 |
| Manganese | 78.9 | 90.3 |
| Magnesium | 81.2 | 91.7 |
| Aluminium | 29.6 | 45.5 |

X-ray diffraction analysis of residue samples indicated that the $M_2O_3$ (predominant impurity bearing phase) was completely removed by both leaches while Leach 2, with sulfuric acid, also removed most of the $M_3O_5$ phase. Only approximately 4% of the contained titania was dissolved in each of the leaches.

TABLE 1

Composition of Ilmenite in Examples 1-3

|  | wt % |
| --- | --- |
| FeO | 9.68 |
| $Fe_2O_3$ | 25.3 |
| $TiO_2$ | 53.4 |
| $Cr_2O_3$ | 0.62 |
| $SiO_2$ | 1.60 |
| $Al_2O_3$ | 1.94 |
| CaO | 0.06 |
| MgO | 1.48 |

TABLE 1-continued

Composition of Ilmenite in Examples 1-3

|  | wt % |
| --- | --- |
| MnO | 1.23 |
| $V_2O_5$ | 0.25 |
| $ZrO_2$ | 0.17 |
| $P_2O_5$ | 0.46 |

TABLE 2

Composition of Ilmenite in Example 4

|  | wt % |
| --- | --- |
| FeO | 23.2 |
| $Fe_2O_3$ | 16.8 |
| $TiO_2$ | 53.8 |
| $Cr_2O_3$ | 0.05 |
| $SiO_2$ | 0.68 |
| $Al_2O_3$ | 0.84 |
| CaO | 0.26 |
| MgO | 0.34 |
| MnO | 1.50 |
| $V_2O_5$ | 0.14 |
| $ZrO_2$ | 0.07 |
| $P_2O_5$ | 0.06 |

TABLE 3

Composition of Ilmenite in Example 5

|  | wt % |
| --- | --- |
| FeO | 10.5 |
| $Fe_2O_3$ | 23.6 |
| $TiO_2$ | 51.4 |
| $Cr_2O_3$ | 1.01 |
| $SiO_2$ | 1.23 |
| $Al_2O_3$ | 1.22 |
| CaO | 0.11 |
| MgO | 1.60 |
| MnO | 1.19 |
| $V_2O_5$ | 0.25 |
| $ZrO_2$ | 0.73 |
| $P_2O_5$ | 1.55 |

TABLE 4

Composition of Ilmenite in Example 6

|  | wt % |
| --- | --- |
| FeO | 8.76 |
| $Fe_2O_3$ | 26.2 |
| $TiO_2$ | 57.3 |
| $Cr_2O_3$ | 0.54 |
| $SiO_2$ | 1.16 |
| $Al_2O_3$ | 0.65 |
| CaO | 0.05 |
| MgO | 1.40 |
| MnO | 1.30 |
| $V_2O_5$ | 0.25 |
| $ZrO_2$ | 0.15 |
| $P_2O_5$ | 0.05 |
| LOI | 0.71 |

What is claimed is:

1. In a process for upgrading the titania content of a titaniferous ore or concentrate containing combined iron comprising the steps of reducing the titaniferous ore or concentrate using a solid carbonaceous reductant to form a reduced product comprising metallic iron, a major rutile phase and a separate minor impurity bearing titaniferous phase, subjecting the reduced product to leaching or aeration to convert said metallic iron into a readily removable form, and removing said metallic iron from the leached or aerated product, the improvement comprising subjecting the product from which iron has been removed to acid leaching utilizing sulfuric acid having a concentration of at least about 20% by weight, at a temperature and pressure sufficient to substantially convert an impurity element other than iron in the minor impurity bearing titaniferous phase to a readily removable form, and removing said impurity element in said readily removable form.

2. A process according to claim 1, wherein the impurity bearing titaniferous phase comprises an anisovite- or pseudobrookite-like phase of the formula $M_3O_5$.

3. A process according to claim 1, wherein the sulfuric acid has a concentration of about 20–50% by weight.

4. A process according to claim 1, wherein the sulfuric acid is at 80°–150° C.

5. A process according to claim 1, wherein the sulfuric acid is under reflux.

6. A process according to claim 1, wherein the acid leaching takes place for a period of 15 minutes to 24 hours.

7. A process according to claim 1, wherein the impurity bearing titaniferous phase comprises an anisovite- or pseudobrookite-like phase of formula $M_3O_5$, and the acid leaching takes place at 80°–150° C. for 15 minutes to 24 hours.

8. A process according to claim 1, wherein the step of reducing takes place at a maximum temperature of 900°–1200° C.

9. A process according to claim 1, additionally comprising a step of acid leaching with hydrochloric acid.

10. In a process for upgrading the titania content of a titaniferous ore or concentrate containing combined iron comprising the steps of reducing the titaniferous ore or concentrate using a solid carbonaceous reductant to produce a reduced product comprising metallic iron, a major rutile phase and a separate minor impurity bearing titaniferous phase, subjecting the reduced product to a leaching or aeration to convert the metallic iron into a readily removable form, removing iron from the leached or aerated product, and subjecting the product from which iron has been removed to an acid treatment,
the improvement comprising conducting said reducing step, with a degree of conversion of combined iron to metallic iron of at least 50%, so as to limit the formation of a difficultly leachable $M_3O_5$ phase while promoting the formation of a more easily leachable titaniferous phase by conducting said reducing at a maximum temperature of 900° to 1100° C. for a time insufficient to complete conversion of impurity iron present in the ore or concentrate to metallic iron, said degree of conversion being less than about 95%; and
utilizing said acid treatment as a leaching process to convert an impurity element other than iron in the minor impurity bearing titaniferous phase to a readily removable form and removing said impurity element therefrom.

11. A process according to claim 10, wherein said reducing takes place at a maximum temperature of 900°–1050° C.

12. A process according to claim 10, wherein the degree of conversion is 50–87%.

13. A process according to claim 10, wherein the impurity bearing titaniferous phase comprises a metatitanate-type phase of formula $M_2O_3$.

14. A process according to claim 13, wherein the impurity bearing titaniferous phase additionally comprises an anisovite- or pseudobrookite type phase of formula $M_3O_5$.

15. A process according to claim 11, additionally comprising a preliminary step of oxidizing the ore or concentrate at a temperature in excess of 700° C., prior to said reducing.

16. A process according to claim 11, wherein the solid carbonaceous reductant is sub-bituminous or lignite coal, or char derived therefrom.

17. A process according to claim 11, wherein said acid treatment utilizes a solution of a strong mineral acid.

18. A process according to claim 17, wherein the mineral acid is sulfuric acid or hydrochloric acid.

19. A process according to claim 17, wherein the acid is at a concentration of 4–50% by weight.

20. A process according to claim 18, wherein the acid is hydrochloric acid at a concentration of about 18–20% by weight.

21. A process according to claim 18, wherein the acid is sulfuric acid at a concentration of about 5% by weight.

22. A process according to claim 11, wherein the acid treatment comprises sequential leaching steps, including a leaching step with hydrochloric acid and a leaching step with sulfuric acid.

23. A process according to claim 14, including an acid treatment step comprising leaching with sulfuric acid of a concentration of at least 20% at a temperature and pressure sufficient to convert an impurity element in the phase of formula $M_3O_5$ to a readily removable form.

24. In a process for upgrading the titania content of a titaniferous ore or concentrate containing combined iron comprising the steps of reducing the titaniferous ore or concentrate using a solid carbonaceous reductant to produce a reduced product comprising metallic iron, a major rutile phase and a separate minor impurity bearing titaniferous phase, subjecting the reduced product to a leaching or aeration to convert the metallic iron into a readily removable form, removing iron from the leached or aerated product, and subjecting the product from which iron has been removed to an acid treatment,
the improvement comprising conducting said reducing step, with a degree of conversion of combined iron to metallic iron of at least 50%, at a maximum temperature of 900° to 1200° C. in the presence of an additive to promote limit the formation the formation of a leachable titaniferous phase; and
utilizing said acid treatment as a leaching process to convert an impurity element other than iron in the minor impurity bearing titaniferous phase to a readily removable form and removing said impurity element therefrom.

25. A process according to claim 24, wherein the additive is a chloride or an oxide.

26. A process according to claim 25, wherein the additive is $MnO_2$.

27. A process according to claim 25, wherein said reducing takes place at a maximum temperature of 900°–1050° C.

28. A process according to claim 25, wherein the impurity bearing titaniferous phase comprises a metatitanate-type phase of formula $M_2O_3$.

29. A process according to claim 25, wherein the impurity bearing titaniferous phase additionally comprises an anisovite- or pseudobrookite type phase of formula $M_3O_5$.

30. A process according to claim 25, additionally comprising a preliminary step of oxidizing the ore or concentrate at a temperature in excess of 700° C., prior to said reducing.

31. A process according to claim 25, wherein the solid carbonaceous reductant is sub-bituminous or lignite coal, or char derived therefrom.

32. A process according to claim 25, wherein said acid treatment utilizes a solution of a strong mineral acid.

33. A process according to claim 32, wherein the mineral acid is sulfuric acid or hydrochloric acid.

34. A process according to claim 32, wherein the acid is at a concentration of 4–50% by weight.

35. A process according to claim 33, wherein the acid is hydrochloric acid at a concentration of about 18–20% by weight.

36. A process according to claim 33, wherein the acid is sulfuric acid at a concentration of about 5% by weight.

37. A process according to claim 25, wherein the acid treatment comprises sequential leaching steps, including a leaching step with hydrochloric acid, and a leaching step with sulfuric acid.

38. A process according to claim 29, including an acid treatment step comprising leaching with sulfuric acid of a concentration of at least 20% at a temperature and pressure sufficient to convert an impurity element in the impurity bearing titaniferous phase to a readily removable form.

39. In a process for upgrading the titania content of a titaniferous ore or concentrate containing combined iron comprising the steps of reducing the titaniferous ore or concentrate using a solid carbonaceous reductant to produce a reduced product comprising metallic iron, a major rutile phase and a separate minor impurity bearing titaniferous phase, subjecting the reduced product to a leaching or aeration to convert the metallic iron into a readily removable form, removing iron from the leached or aerated product, and subjecting the product from which iron has been removed to an acid treatment, the improvement comprising conducting said reducing step, with a degree of conversion of combined iron to metallic iron of at least 50%, so as to limit the formation of a difficultly leachable $M_3O_5$ phase while promoting the formation of a more easily leachable titaniferous phase, comprising one of the steps:

(a) conducting said reducing at a maximum temperature of 900° to 1100° C. for a time insufficient to complete conversion of impurity iron present in the ore or concentrate to metallic iron, said degree of conversion being less than about 95%; or (b) conducting said reducing at a maximum temperature of 900° to 1200° C. in the presence of an additive the formation of a leachable titaniferous phase; and utilizing said acid treatment as a leaching process to convert an impurity element other than iron in the minor impurity bearing titaniferous phase to a readily removable form and removing said impurity element therefrom.

* * * * *

UNITED STATES PATENT AND TRADEMARK OFFICE
CERTIFICATE OF CORRECTION

PATENT NO. : 5,427,749                  Page 1 of 2

DATED : June 27, 1995

INVENTOR(S) : Michael J. Hollitt, Brian A. O'Brien and Ian E. Grey

It is certified that error appears in the above-indentified patent and that said Letters Patent is hereby corrected as shown below:

In the Abstract, line 4, "or iron" should be --of iron--.

Column 1, line 29, "oar" should be --or--.

Column 2, line 51, "front" should be --from--.

Column 3, line 8, "convert:" should be --convert--.

Column 6, line 31, "hours;" should be --hours--.

Column 7, line 38, "profile,," should be --profile,--.

Column 7, line 38, after "950" add --$\pm$--.

Column 8, line 66, add a period after --$sec^{-1}$--.

Column 12, line 46, "promote limit the" should be --promote the--.

Column 12, lines 46-47, "the formation the formation" should be --the formation--.

Column 14, line 24, "the formation of a leachable" should be --to promote the formation of a more easily--.

UNITED STATES PATENT AND TRADEMARK OFFICE
CERTIFICATE OF CORRECTION

PATENT NO. : 5,427,749

DATED : June 27, 1995

INVENTOR(S) : Michael J. Hollitt, Brian A. O'Brien and Ian E. Grey

It is certified that error appears in the above-indentified patent and that said Letters Patent is hereby corrected as shown below:

Column 14, line 24, "the formation of a leachable" should be --to promote the formation of a more easily--.

Signed and Sealed this

Seventh Day of November, 1995

Attest:

BRUCE LEHMAN

Attesting Officer        Commissioner of Patents and Trademarks